(12) United States Patent
Parashar et al.

(10) Patent No.: US 11,687,210 B2
(45) Date of Patent: Jun. 27, 2023

(54) CRITERIA-BASED EXPANSION OF GROUP NODES IN A NETWORK TOPOLOGY VISUALIZATION

(71) Applicant: VMware, Inc., Palo Alto, CA (US)

(72) Inventors: Shrinivas Sharad Parashar, Pune (IN); Priyanka Luthra, Pune (IN); Tarang Khandelwal, Pune (IN); Sarat Chandra Annadata, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/530,826

(22) Filed: Nov. 19, 2021

(65) Prior Publication Data
US 2023/0006886 A1    Jan. 5, 2023

(30) Foreign Application Priority Data

Jul. 5, 2021  (IN) .............................. 202141030116

(51) Int. Cl.
*G06F 3/04817* (2022.01)
*H04L 41/12* (2022.01)
*H04L 41/22* (2022.01)
*G06F 9/455* (2018.01)
*G06F 3/0482* (2013.01)

(52) U.S. Cl.
CPC ........ *G06F 3/04817* (2013.01); *G06F 3/0482* (2013.01); *G06F 9/45558* (2013.01); *H04L 41/12* (2013.01); *H04L 41/22* (2013.01)

(58) Field of Classification Search
CPC ... G06F 3/04817; G06F 3/0482; H04L 41/22; H04L 41/12
See application file for complete search history.

(56) References Cited

U.S. PATENT DOCUMENTS 5,224,100 A    6/1993   Lee et al.
5,245,609 A    9/1993   Ofek et al.
(Continued)

FOREIGN PATENT DOCUMENTS

EP        1154601 A1      11/2001
JP    2002141905 A       5/2002
(Continued)

OTHER PUBLICATIONS

Non-Published commonly Owned U.S. Appl. No. 17/732,440, filed Apr. 28, 2022, 46 pages, VMware, Inc.
(Continued)

*Primary Examiner* — Mong-Shune Chung
(74) *Attorney, Agent, or Firm* — Adeli LLP

(57) ABSTRACT

Some embodiments provide a method for presenting a visualization of a topology for a logical network. In response to receiving a selection of a particular user interface (UI) item representing a particular group of logical elements, the method presents one or more filter UI items for the particular group of logical elements. Each filter UI item corresponds to a different attribute associated with the logical elements. Upon receiving selection of one or more attribute states for each attribute for which a filter UI item is presented, the method identifies logical elements in the group of logical elements that match the selected attribute states. The method presents, in the UI, an expanded version of the particular group of logical elements that emphasizes the identified logical elements that match the selected attribute states.

22 Claims, 12 Drawing Sheets

(56) References Cited

U.S. PATENT DOCUMENTS

| | | |
|---|---|---|
| 5,265,092 A | 11/1993 | Soloway et al. |
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 5,781,534 A | 7/1998 | Perlman et al. |
| 5,805,819 A | 9/1998 | Chin et al. |
| 6,104,699 A | 8/2000 | Holender et al. |
| 6,104,700 A | 8/2000 | Haddock et al. |
| 6,141,738 A | 10/2000 | Munter et al. |
| 6,219,699 B1 | 4/2001 | McCloghrie et al. |
| 6,430,160 B1 | 8/2002 | Smith et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,658,002 B1 | 12/2003 | Ross et al. |
| 6,680,934 B1 | 1/2004 | Cain |
| 6,721,334 B1 | 4/2004 | Ketcham |
| 6,785,843 B1 | 8/2004 | McRae et al. |
| 6,882,642 B1 | 4/2005 | Kejriwal et al. |
| 6,941,487 B1 | 9/2005 | Balakrishnan et al. |
| 6,963,585 B1 | 11/2005 | Pennec et al. |
| 6,999,454 B1 | 2/2006 | Crump |
| 7,013,342 B2 | 3/2006 | Riddle |
| 7,062,559 B2 | 6/2006 | Koshimura et al. |
| 7,079,544 B2 | 7/2006 | Wakayama et al. |
| 7,180,856 B1 | 2/2007 | Breslau et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,243,143 B1 | 7/2007 | Bullard |
| 7,283,473 B2 | 10/2007 | Arndt et al. |
| 7,315,985 B1 | 1/2008 | Gauvin et al. |
| 7,342,916 B2 | 3/2008 | Das et al. |
| 7,391,771 B2 | 6/2008 | Orava et al. |
| 7,450,598 B2 | 11/2008 | Chen et al. |
| 7,457,870 B1 | 11/2008 | Lownsbrough et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,577,131 B2 | 8/2009 | Joseph et al. |
| 7,590,133 B2 | 9/2009 | Hatae et al. |
| 7,602,723 B2 | 10/2009 | Mandate et al. |
| 7,606,260 B2 | 10/2009 | Oguchi et al. |
| 7,627,692 B2 | 12/2009 | Pessi |
| 7,633,955 B1 | 12/2009 | Saraiya et al. |
| 7,639,625 B2 | 12/2009 | Kaminsky et al. |
| 7,643,488 B2 | 1/2010 | Khanna et al. |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,729,245 B1 | 6/2010 | Breslau et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,919 B2 | 10/2010 | Nadeau et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,937,492 B1 | 5/2011 | Kompella et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,024,478 B2 | 9/2011 | Patel |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,254,273 B2 | 8/2012 | Kaminsky et al. |
| 8,265,062 B2 | 9/2012 | Tang et al. |
| 8,265,075 B2 | 9/2012 | Pandey |
| 8,281,067 B2 | 10/2012 | Stolowitz |
| 8,290,137 B2 | 10/2012 | Kurchenko et al. |
| 8,306,043 B2 | 11/2012 | Breslau et al. |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,558 B2 | 1/2013 | Nicholson et al. |
| 8,351,418 B2 | 1/2013 | Zhao et al. |
| 8,359,576 B2 | 1/2013 | Prasad et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,645,952 B2 | 2/2014 | Biswas et al. |
| 8,750,288 B2 | 6/2014 | Nakil et al. |
| 8,762,501 B2 | 6/2014 | Kempf et al. |
| 8,806,005 B2 | 8/2014 | Miri et al. |
| 8,837,300 B2 | 9/2014 | Nedeltchev et al. |
| 8,838,743 B2 | 9/2014 | Lewites et al. |
| 8,929,221 B2 | 1/2015 | Breslau et al. |
| 8,934,495 B1 | 1/2015 | Hilton et al. |
| 9,059,926 B2 | 6/2015 | Akhter et al. |
| 9,197,529 B2 | 11/2015 | Ganichev et al. |
| 9,226,220 B2 | 12/2015 | Banks et al. |
| 9,258,195 B1 | 2/2016 | Pendleton et al. |
| 9,280,448 B2 | 3/2016 | Farrell et al. |
| 9,282,019 B2 | 3/2016 | Ganichev et al. |
| 9,344,349 B2 | 5/2016 | Ganichev et al. |
| 9,407,580 B2 | 8/2016 | Ganichev et al. |
| 9,602,334 B2 | 3/2017 | Benny |
| 9,860,151 B2 | 1/2018 | Ganichev et al. |
| 9,898,317 B2 | 2/2018 | Nakil et al. |
| 10,044,581 B1 | 8/2018 | Russell |
| 10,181,993 B2 | 1/2019 | Ganichev et al. |
| 10,200,306 B2 | 2/2019 | Nhu et al. |
| 10,469,342 B2 | 11/2019 | Lenglet et al. |
| 10,608,887 B2 | 3/2020 | Jain et al. |
| 10,778,557 B2 | 9/2020 | Ganichev et al. |
| 10,805,239 B2 | 10/2020 | Nhu et al. |
| 11,128,550 B2 | 9/2021 | Lenglet et al. |
| 11,196,628 B1 | 12/2021 | Shen et al. |
| 11,201,808 B2 | 12/2021 | Ganichev et al. |
| 11,336,533 B1 | 5/2022 | Bogado et al. |
| 11,336,590 B2 | 5/2022 | Nhu et al. |
| 2001/0020266 A1 | 9/2001 | Kojima et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |

(56) References Cited

U.S. PATENT DOCUMENTS

| | | |
|---|---|---|
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0149604 A1 | 7/2005 | Navada |
| 2005/0182853 A1 | 8/2005 | Lewites et al. |
| 2005/0220030 A1 | 10/2005 | Nagami et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0218447 A1 | 9/2006 | Garcia et al. |
| 2006/0221961 A1 | 10/2006 | Basso et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1 | 5/2007 | Wen et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0021925 A1* | 1/2008 | Sweeney ............... G06N 5/02 |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0150527 A1 | 6/2009 | Tripathi et al. |
| 2009/0245138 A1 | 10/2009 | Sapsford et al. |
| 2009/0248895 A1 | 10/2009 | Archer et al. |
| 2009/0249213 A1 | 10/2009 | Murase et al. |
| 2009/0292858 A1 | 11/2009 | Lambeth et al. |
| 2009/0327903 A1 | 12/2009 | Smith et al. |
| 2010/0128623 A1 | 5/2010 | Dunn et al. |
| 2010/0131636 A1 | 5/2010 | Suri et al. |
| 2010/0188976 A1 | 7/2010 | Rahman et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0137602 A1 | 6/2011 | Desineni et al. |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0151352 A1 | 6/2012 | Ramprasad et al. |
| 2012/0159454 A1 | 6/2012 | Barham et al. |
| 2012/0182992 A1 | 7/2012 | Cowart et al. |
| 2012/0275331 A1 | 11/2012 | Benkö et al. |
| 2012/0287791 A1 | 11/2012 | Xi et al. |
| 2012/0314599 A1 | 12/2012 | Vilke et al. |
| 2013/0010600 A1 | 1/2013 | Jocha et al. |
| 2013/0019008 A1 | 1/2013 | Jorgenson et al. |
| 2013/0024579 A1 | 1/2013 | Zhang et al. |
| 2013/0031233 A1 | 1/2013 | Feng et al. |
| 2013/0041934 A1 | 2/2013 | Annamalaisami et al. |
| 2013/0044636 A1 | 2/2013 | Koponen et al. |
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0125120 A1 | 5/2013 | Zhang et al. |
| 2013/0163427 A1 | 6/2013 | Beliveau et al. |
| 2013/0163475 A1 | 6/2013 | Beliveau et al. |
| 2013/0294249 A1 | 11/2013 | Lin et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0219086 A1 | 8/2014 | Cantu' et al. |
| 2014/0281030 A1 | 9/2014 | Cui et al. |
| 2014/0282823 A1 | 9/2014 | Rash et al. |
| 2014/0297846 A1 | 10/2014 | Hoja et al. |
| 2014/0304393 A1 | 10/2014 | Annamalaisami et al. |
| 2014/0351415 A1 | 11/2014 | Harrigan et al. |
| 2015/0016286 A1 | 1/2015 | Ganichev et al. |
| 2015/0016287 A1 | 1/2015 | Ganichev et al. |
| 2015/0016298 A1 | 1/2015 | Ganichev et al. |
| 2015/0016469 A1 | 1/2015 | Ganichev et al. |
| 2015/0043378 A1 | 2/2015 | Bardgett et al. |
| 2015/0180755 A1 | 6/2015 | Zhang et al. |
| 2015/0195169 A1 | 7/2015 | Liu et al. |
| 2015/0263899 A1 | 9/2015 | Tubaltsev et al. |
| 2015/0271011 A1 | 9/2015 | Neginhal et al. |
| 2015/0281036 A1 | 10/2015 | Sun et al. |
| 2016/0105333 A1 | 4/2016 | Lenglet et al. |
| 2016/0119204 A1 | 4/2016 | Murasato et al. |
| 2016/0149791 A1 | 5/2016 | Ganichev et al. |
| 2016/0226741 A1 | 8/2016 | Ganichev et al. |
| 2016/0274558 A1 | 9/2016 | Strohmenger et al. |
| 2016/0359880 A1 | 12/2016 | Pang et al. |
| 2017/0026270 A1 | 1/2017 | Shankar |
| 2017/0222881 A1 | 8/2017 | Holbrook et al. |
| 2017/0288991 A1 | 10/2017 | Ganesh |
| 2017/0317954 A1 | 11/2017 | Masurekar et al. |
| 2017/0358111 A1 | 12/2017 | Madsen |
| 2017/0373950 A1 | 12/2017 | Szilagyi et al. |
| 2018/0062939 A1 | 3/2018 | Kulkarni et al. |
| 2018/0063188 A1 | 3/2018 | Karin et al. |
| 2018/0091388 A1 | 3/2018 | Levy et al. |
| 2018/0102959 A1 | 4/2018 | Ganichev et al. |
| 2018/0123903 A1 | 5/2018 | Holla et al. |
| 2018/0136798 A1* | 5/2018 | Aggour ............... H04L 43/045 |
| 2018/0262541 A1 | 9/2018 | Nhu et al. |
| 2018/0262594 A1 | 9/2018 | Nhu et al. |
| 2018/0309637 A1 | 10/2018 | Gill et al. |
| 2018/0373961 A1 | 12/2018 | Wang et al. |
| 2019/0014029 A1 | 1/2019 | Burgio et al. |
| 2019/0109769 A1 | 4/2019 | Jain et al. |
| 2019/0140931 A1 | 5/2019 | Ganichev et al. |
| 2019/0158377 A1 | 5/2019 | Chau |
| 2020/0067799 A1 | 2/2020 | Lenglet et al. |
| 2020/0106744 A1 | 4/2020 | Miriyala et al. |
| 2020/0136943 A1 | 4/2020 | Banyai et al. |
| 2020/0204457 A1 | 6/2020 | Hu et al. |
| 2020/0210195 A1 | 7/2020 | Lampert et al. |

(56) References Cited

U.S. PATENT DOCUMENTS

| | | |
|---|---|---|
| 2020/0304389 A1* | 9/2020 | Bauan .................. H04L 41/22 |
| 2020/0322243 A1 | 10/2020 | Xi et al. |
| 2020/0336387 A1* | 10/2020 | Suzuki .................. H04L 41/12 |
| 2021/0014157 A1 | 1/2021 | Zhou |
| 2021/0029059 A1 | 1/2021 | Nhu et al. |
| 2021/0051100 A1 | 2/2021 | Chitalia et al. |
| 2021/0051109 A1 | 2/2021 | Chitalia et al. |
| 2021/0216908 A1 | 7/2021 | Lu et al. |
| 2021/0218630 A1 | 7/2021 | Lu et al. |
| 2021/0266259 A1 | 8/2021 | Renner, III et al. |
| 2021/0311764 A1 | 10/2021 | Rosoff et al. |
| 2022/0014451 A1 | 1/2022 | Naik et al. |
| 2022/0038368 A1 | 2/2022 | Shen et al. |
| 2022/0038501 A1 | 2/2022 | Shen et al. |
| 2022/0103452 A1 | 3/2022 | Ganichev et al. |
| 2022/0150136 A1* | 5/2022 | Chen .................. H04L 41/12 |
| 2022/0165035 A1 | 5/2022 | Cui et al. |
| 2022/0210120 A1 | 6/2022 | Nigam et al. |
| 2022/0224620 A1 | 7/2022 | Chhabra et al. |
| 2022/0263721 A1 | 8/2022 | Bogado et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |
| WO | 2013184846 A1 | 12/2013 |
| WO | 2015005968 A1 | 1/2015 |

OTHER PUBLICATIONS

Non-Published commonly Owned U.S. Appl. No. 17/185,690, filed Feb. 25, 2021, 38 pages, VMware, Inc.

Non-Published commonly Owned U.S. Appl. No. 17/185,824, filed Feb. 25, 2021, 32 pages, VMware, Inc.

Non-Published commonly Owned U.S. Appl. No. 17/507,449, filed Oct. 21, 2021, 47 pages, VMware, Inc.

Non-Published commonly Owned U.S. Appl. No. 17/507,453, filed Oct. 21, 2021, 48 pages, VMware, Inc.

Non-Published commonly Owned U.S. Appl. No. 17/507,462, filed Oct. 21, 2021, 47 pages, VMware, Inc.

Non-Published commonly Owned U.S. Appl. No. 17/530,898, filed Nov. 19, 2021, 39 pages, VMware, Inc.

Non-Published commonly Owned U.S. Appl. No. 17/548,400, filed Dec. 10, 2021, 55 pages, Nicira, Inc.

Phaal, Peter, et al., "sFlow Version 5," Jul. 2004, 46 pages, available at http://www.sflow.org/sflow_version_5.txt.

Phan, Doantam, et al., "Visual Analysis of Network Flow Data with Timelines and Event Plots," VizSEC 2007, Month Unknown 2007, 16 pages.

* cited by examiner

CRITERIA-BASED EXPANSION OF GROUP NODES IN A NETWORK TOPOLOGY VISUALIZATION

BACKGROUND

Today, network topologies represent hierarchical relationships between logical elements such as gateways, segments, virtual machines (VMs), containers, etc. In a scaled environment, scenarios exist in which hundreds of child nodes are connected to a parent node (e.g., hundreds of VMs connected to a single segment), which are initially represented as a group node. When such a group node is expanded, all of the individual nodes are displayed on the graph at once, which can lead to context loss for users, while also making it difficult to focus on any specific logical elements of interest.

BRIEF SUMMARY

Some embodiments of the invention provide a method for presenting a visualization of a logical network topology. In response to receiving a selection of a particular user interface (UI) item that represents a particular group of logical elements, the method presents one or more filter UI items corresponding to a different attribute associated with the logical elements of the group. Based on selection of one or more attribute states for each attribute for which a filter UI item is presented, the method identifies logical elements in the group of logical elements that match the selected attribute states and presents in the UI an expanded version of the particular group of logical elements that emphasizes the identified logical elements that match the selected attribute states.

The particular UI item, in some embodiments, is part of a set of UI items presented hierarchically in the UI. Each UI item in the set represents one or more logical elements of a respective type. In some embodiments, the set of UI items are arranged in the UI hierarchically by type of logical element and based on logical network connections. In some embodiments, the set of logical element types include at least virtual machine (VM), logical switch, tier-1 logical router that connects groups of logical switches, and tier-0 logical router that connects other logical elements in the logical network to external networks. The UI items representing these logical elements are presented with the logical network endpoints (e.g., VMs, containers, bare metal computers, etc.) at the bottom. In some embodiments, each logical network endpoint connects to a logical switch (each of which may have multiple connected endpoints). In turn, most logical switches connect to a tier-1 logical router (each of which may have multiple connected logical switches), and most tier-1 logical routers connect to a tier-0 logical router (each of which may have multiple connected tier-1 logical routers). Additionally, logical switches can also connect directly to tier-0 logical routers (each of which may have one or more connected logical switches in addition to connected tier-1 logical routers).

The particular UI item representing the group of logical elements, in some embodiments, is a group node. In some embodiments, the UI represents a group of logical elements using a group node when the number of logical elements in the group exceeds a threshold number. Additionally, when one or more items representing logical elements and/or groups of logical elements of a first type (e.g., VMs) are logically connected to one or more logical elements in a group of logical elements of a second type (e.g., logical switches) that is higher in the hierarchy than the first type and that is represented by a group node, some embodiments group the one or more first-type logical elements using a single group node under the group node representing the second-type logical elements. In some embodiments, this is done irrespective of (i) whether the number of first-type logical elements exceeds a threshold number and (ii) whether the first-type logical elements all connect to the same second-type logical element (e.g., a group of VMs connected to different logical switches that are grouped together). In other words, when a group of parent nodes are represented as a single group node, in some embodiments, all of the child nodes of those parent nodes are also represented as a single group node under the parent group node.

In order to present one or more filter UI items for the particular group of logical elements, some embodiments identify a set of potential attributes associated with the logical elements, and, for each potential attribute in the set of potential attributes, determine a current state of the attribute for each logical element in the particular group of logical elements. When at least two logical elements in the particular group have different current states for a particular attribute in the set of potential attributes, in some embodiments, a filter UI item corresponding to the particular attribute is presented. For instance, selection of a group node for VMs could bring up a filter UI item allowing selection of VMs that are powered on or powered off (or both). In some embodiments, each filter UI item presents at least two different states for the particular attribute as selectable attribute states for the attribute corresponding to the filter UI item, and for each potential attribute for which all logical elements in the particular group of logical elements have a same current state, no filter UI item is presented in the UI (e.g., if all VMs in the group are powered on, then no filter UI item is presented for the powered on/off state).

The method expands the group node based on the selection of the filter UI items specifying which members of the represented group of logical elements the user wants to see emphasized. In some embodiments, the expanded version of the particular group of logical elements includes (i) a set of individual nodes that each represent a logical element with attribute states matching the filter UI item selections and (ii) one or more group nodes representing the other logical elements in the group that do not match the selected attribute states. In some embodiments, though, when the number of logical elements with attribute states matching the filter UI item selections and that are represented by nodes that are children of the same parent node exceeds a threshold, these nodes are still presented as a group node (i.e., a separate group node that includes only nodes representing logical elements that match the selected attribute state(s)). Prior to the expansion, the group node representing the group of logical elements specifies a first number of logical elements represented by the node and after the expansion, each new group node specifies a second number of logical elements represented by the new group node to reflect the filtered logical elements.

When the particular group of logical elements are children of another group of logical elements that is higher in the hierarchy and also represented by a group node, some embodiments present an expanded version of the other group node in addition to an expanded version of the particular group of logical elements such that any logical elements in the other group that are logically connected to at least one of the identified logical elements are represented as individual nodes, while the remaining logical elements are represented by a group node. In this case, multiple group nodes for the particular group of logical elements. For instance, if a group of VMs is expanded, then the logical switches to which that group of VMs connect may also need to be expanded, and some of these logical switches may have groups of connected VMs that do not match the attribute states selected in the filter UI item.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
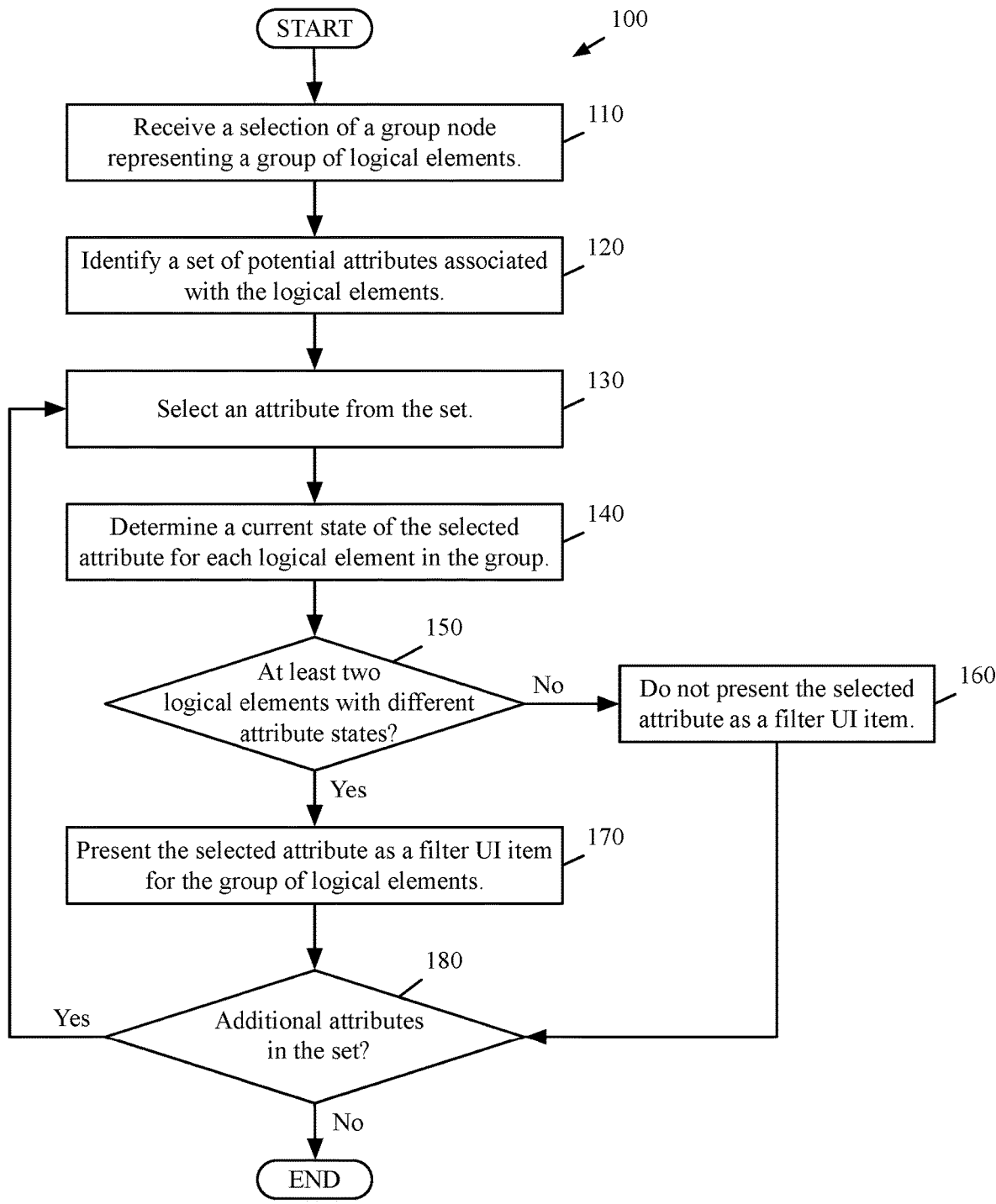
FIG. 1 illustrates a process performed in some embodiments to determine the attribute states to be presented as filter UI items for a selected group of logical elements.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for presenting a visualization of a logical network topology. In response to receiving a selection of a particular user interface (UI) item that represents a particular group of logical elements, the method presents one or more filter UI items corresponding to a different attribute associated with the logical elements of the group. Based on selection of one or more attribute states for each attribute for which a filter UI item is presented, the method identifies logical elements in the group of logical elements that match the selected attribute states and presents in the UI an expanded version of the particular group of logical elements that emphasizes the identified logical elements that match the selected attribute states.

In some embodiments, the particular UI item is part of a set of UI items presented hierarchically in the UI. Each UI item in the set represents one or more logical elements of a respective type. In some embodiments, the set of UI items are arranged in the UI hierarchically by type of logical element and based on logical network connections. In some embodiments, the set of logical element types include at least virtual machine (VM), logical switch, tier-1 logical router that connects groups of logical switches, and tier-0 logical router that connects other logical elements in the logical network to external networks. The UI items representing these logical elements are presented with the logical network endpoints (e.g., VMs, containers, bare metal computers, etc.) at the bottom. In some embodiments, each logical network endpoint connects to a logical switch (each of which may have multiple connected endpoints). In turn, most logical switches connect to a tier-1 logical router (each of which may have multiple connected logical switches), and most tier-1 logical routers connect to a tier-0 logical router (each of which may have multiple connected tier-1 logical routers). Additionally, logical switches can also connect directly to tier-0 logical routers (each of which may have one or more connected logical switches in addition to connected tier-1 logical routers).

The particular UI item representing the group of logical elements, in some embodiments, is a group node. In some embodiments, the UI represents a group of logical elements using a group node when the number of logical elements in the group exceeds a threshold number. Additionally, when one or more items representing logical elements and/or groups of logical elements of a first type (e.g., VMs) are logically connected to one or more logical elements in a group of logical elements of a second type (e.g., logical switches) that is higher in the hierarchy than the first type and that is represented by a group node, some embodiments group the one or more first-type logical elements using a single group node under the group node representing the second-type logical elements. In some embodiments, this is done irrespective of (i) whether the number of first-type logical elements exceeds a threshold number and (ii) whether the first-type logical elements all connect to the same second-type logical element (e.g., a group of VMs connected to different logical switches that are grouped together). In other words, when a group of parent nodes are represented as a single group node, in some embodiments, all of the child nodes of those parent nodes are also represented as a single group node under the parent group node.

As mentioned, when expanding a group node representing a group of logical elements, some embodiments present one or more filter UI items for the particular group of logical elements. Specifically, some embodiments identify a set of attributes for which selectable attribute states should be presented as filter UI items and then present those attribute states for selection. In some embodiments, when the number of nodes in a set of nodes that represent logical elements with attribute states matching a selected filter UI item and that are children of the same parent node does not exceed the threshold for presenting logical elements of that type as a group node, the logical elements are represented by individual nodes in the expanded group node. Conversely, when the number of nodes in a set of nodes that represent logical elements with attribute states matching the selected filter UI item and that are children of the same parent node does exceed this threshold, the logical elements are represented by a separate group node in the expanded group node. In order to make clear which group nodes represent logical elements matching the selected filter UI item group node, in some embodiments, the group node is presented differently (e.g., with a thicker outline, with a different color, etc.) than other group nodes that do not represent logical elements with attribute states matching the selected filter UI item.

FIG. 1 conceptually illustrates a process 100 of some embodiments for determining attributes to be presented as filter UI items for a selected group of logical elements. In some embodiments, the process 100 is performed by a network visualization application. This application may be a stand-alone application or part of a larger network management application. The process 100 will be described below with reference to FIGS. 2 and 3, which illustrate example UIs presenting different filter UI items based on different group node selections.

Figure 2:
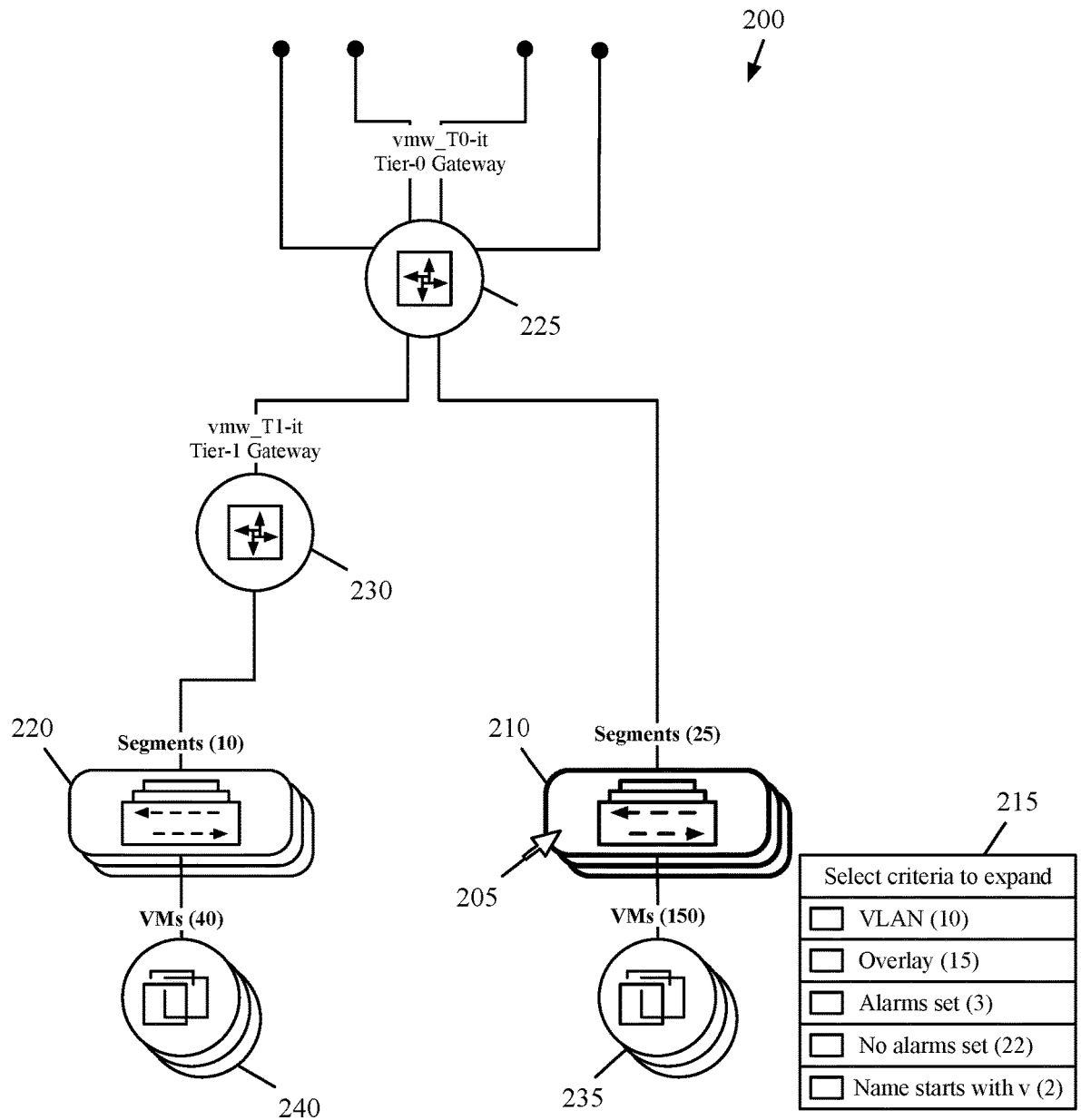
FIG. 2 illustrates a logical network topology presented in a UI diagram of some embodiments in which a group node has been selected for filtering.
Figure 3:
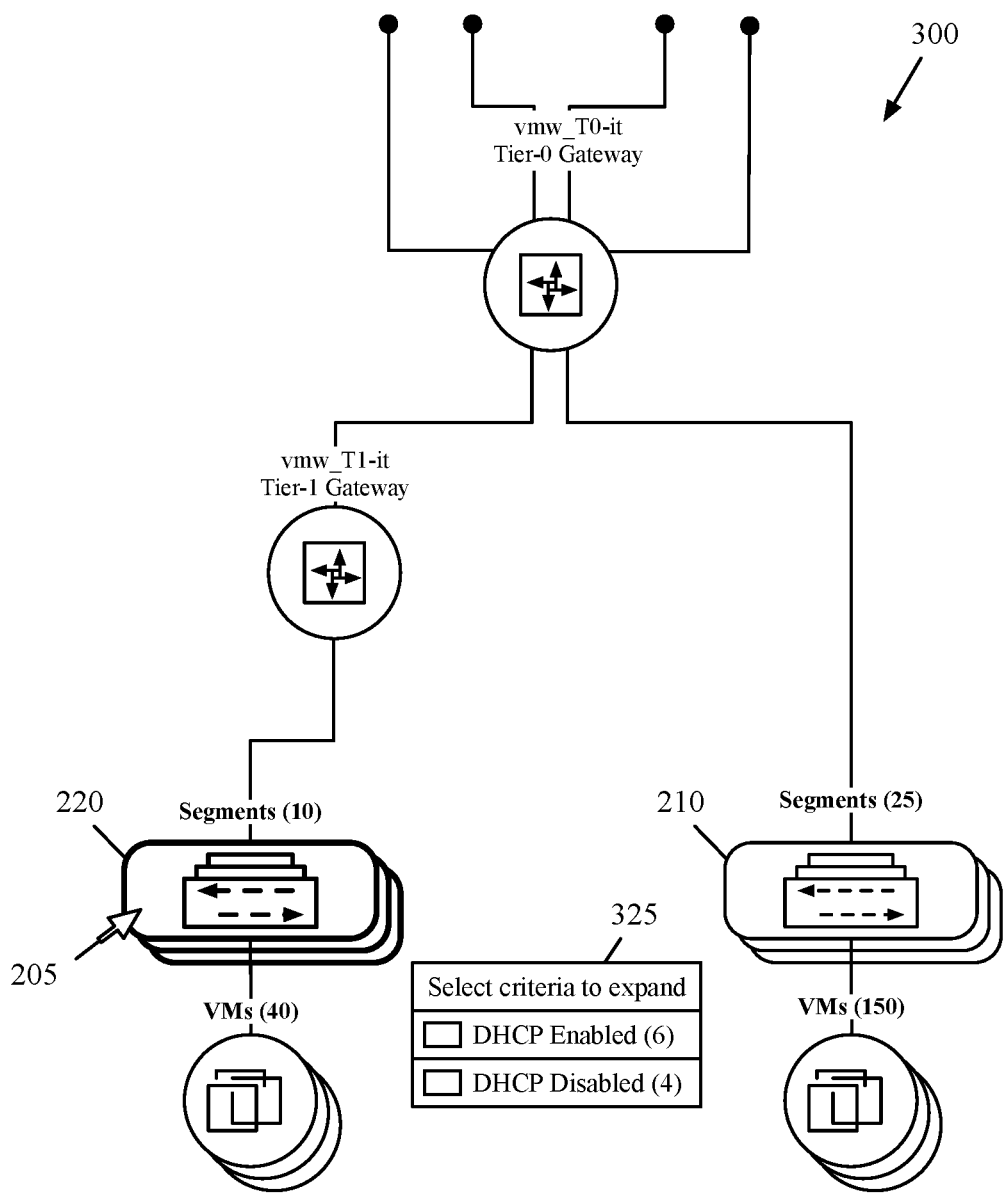
FIG. 3 illustrates a logical network topology presented in another UI diagram of some embodiments in which another group node has been selected for filtering.

The process 100 starts by receiving (at 110) a selection of a group node representing a group of logical elements. As mentioned above, the types of logical elements, in some embodiments, include VMs, logical switches, tier-1 logical routers that connect groups of logical switches, tier-0 logical routers that connect other logical elements in the logical network to external networks, and/or other logical forwarding elements. The selection of a group node may be performed by a user via a cursor selection, touchscreen selection, or other selection mechanism. For example, the UI 200 shown in FIG. 2 illustrates a logical network with a tier-0 gateway (represented by node 225). Connected to this tier-01 gateway is a tier-1 gateway (represented by node 230), as well as 25 segments that connect directly to the tier-0 gateway and are represented by a group node 210. Collectively, 150 VMs connect to these 25 segments and are represented by a group node 235. In some embodiments, when a group node is displayed for a logical element at a first level in the hierarchy (e.g., the group node 210), all of the elements at a second level below the first level in the hierarchy that connect to any of the grouped elements are themselves grouped, even if they do not all connect to the same individual logical element in the group. Similarly, 10 segments connect to the tier-1 gateway and are represented by a group node 220, with 40 VMs collectively connected to these 10 segments and represented by a group node 240. In FIG. 2, the group node 210 representing 25 segments is selected by a cursor 205. Similarly, the UI 300 in FIG. 3 illustrates the group node 220 representing 10 segments being selected by the cursor 205.

The process identifies (at 120) a set of potential attributes associated with the logical elements represented by the group node. For example, if the selected group node represents a virtual machine, the potential attributes can include whether or not the VM is powered on or off, VM tags and tag scope, as well as any custom filters defined by a user (e.g., "VM name starts with . . . "). Additionally, examples of potential attributes for tier-1 gateway logical routers include failover mode (e.g., preemptive or non-preemptive), multicast state (e.g., enabled or disabled), DHCP state (e.g., configured or not configured), virtual private network (VPN) service state (e.g., configured or not configured), state of network address translation (NAT) rules (e.g., configured or not configured), load balancer state (e.g., configured or not configured), gateway firewall state (e.g., enabled or disabled), alarm state (i.e., whether any alarms are set), realization status, gateway tags and tag scope, and any custom filters defined by a user. Lastly, examples of potential attributes for layer-2 segments include segment type (e.g., whether the segment is an overlay logical switch or an uplink VLAN), alarm state (i.e., whether any alarms are set on any segments), DHCP state (e.g., configured or not configured), admin state (e.g., up or down), connectivity state (e.g., on or off), replication mode (e.g., hierarchical two-tier replication or head end replication), realization status, segment tags and tag scope, as well as any user-defined custom filters.

The process then selects (at 130) an attribute from the set of potential attributes identified for the logical elements, and determines (at 140) a current state of the selected attribute for each logical element in the group. For the VM attribute of powered on/off, for example, the process determines for each VM in the group whether the VM is powered on or off at the time the group node is selected. Similarly, for a group of L2 segments, the process determines the segment type for each segment, whether any alarms are set on the segment, etc. Some of the attribute states are immutable for a given logical element (e.g., whether the segment is an overlay logical switch or a VLAN), while other attribute states can change at any time (e.g., whether a VM is powered on, whether any alarms are set on a segment, etc.).

After determining the current state of the selected attribute for each logical element in the group, the process determines (at 150) whether at least two logical elements in the group have different attribute states for the selected attribute. For example, if the selected group node represents a group of segments, and the current selected attribute is segment type, at least two of the segments would have to be determined to be of at least two different types for the attribute to be used as a filter UI item. When the process determines (at 150) that at least two logical elements in the group do not have different attribute states for the selected attribute (i.e., all of the logical elements have the same current state for the attribute), the process transitions to 160 and does not present the selected attribute as a filter UI item. Following 160, the process transitions to 180.

Otherwise, when the process determines (at 150) that at least two logical elements in the selected group have different states for the selected attribute, the process transitions to 170 to present the selected attribute as a filter UI item for the group of logical elements. The process in some embodiments presents attributes as filter UI items by presenting the different attribute states as selectable filter UI items for filtering the selected group of logical elements. In some embodiments, different groups of logical elements of the same type can have different filter UI items presented for selection based on the determined current states of the attributes. For example, in the UI 200, the selected group node 210 has a set of filter UI items 215 for three attributes including segment type (e.g., VLAN or overlay), alarms (e.g., whether any alarms are set on the segments or not), and a custom filter for filtering out segments with names that start with "v". In another example, the selected group node 220 in the UI 300 has a set of filter UI items 325 allowing the segments in the group node 220 to be filter based on whether DHCP is enabled or disabled. The latter filter (DHCP enabled/disabled) is not presented for the group node 210 because all of the segments represented by that group node 210 have the same DHCP setting. Similarly, all of the segments represented by the group node 220 are the same segment type and have the same alarm state.

After presenting the attributes (at 170), the process determines (at 180) whether there are additional attributes in the set of potential attributes for which current states need to be determined for the group of logical elements. When the process determines (at 180) that there are additional attributes in the set, the process transitions back to 130 to select an attribute. Otherwise, when the process determines (at 180) that there are no other attributes in the set, the process ends. It should be understood that the process 100 is a conceptual process, and the actual operations performed by a network visualization application might be slightly different. For instance, rather than serially determining the states for each attribute and whether to present options for that attribute in the UI, some embodiments examine each attribute in parallel and present all of the filter UI items together at once. In addition, while FIGS. 2 and 3 display all of the filter UI items as part of a single UI construct, other embodiments display a separate UI construct for each attribute that is presented.

The method expands the group node based on the selection of the filter UI items specifying which members of the represented group of logical elements the user wants to see emphasized. In some embodiments, the expanded version of the particular group of logical elements includes (i) a set of individual nodes that each represent a logical element with attribute states matching the filter UI item selections and (ii) one or more group nodes representing the other logical elements in the group that do not match the selected attribute states. Prior to the expansion, the group node representing the group of logical elements specifies a first number of logical elements represented by the node and after the expansion, each new group node specifies a second number of logical elements represented by the new group node to reflect the filtered logical elements.

Figure 4:
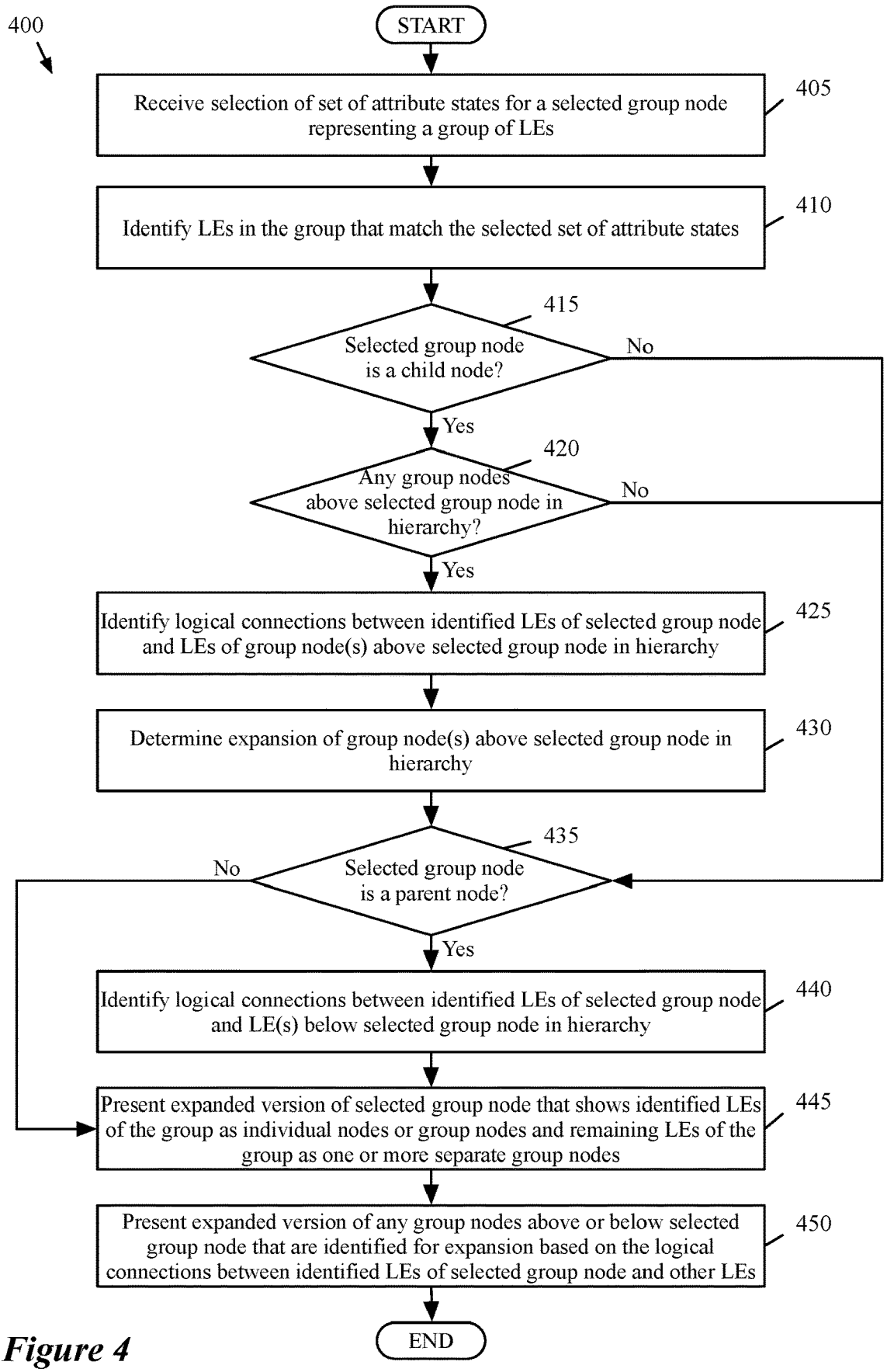
FIG. 4 illustrates a process performed in some embodiments following the process described in FIG. 1 when one or more filter UI items for a group of logical elements have been selected.

FIG. 4 illustrates a process 400 performed in some embodiments following the selection of one or more of the filter UI items for a group of logical elements. As with the process 100 described above, the process 400 of some embodiments is performed by a network visualization application (e.g., a stand-alone application or part of a larger network management application). The process 400 will be described with reference to the UI examples illustrated in FIGS. 5A-5C, 6A-6B, and 7A-7B.

Figure 5A:
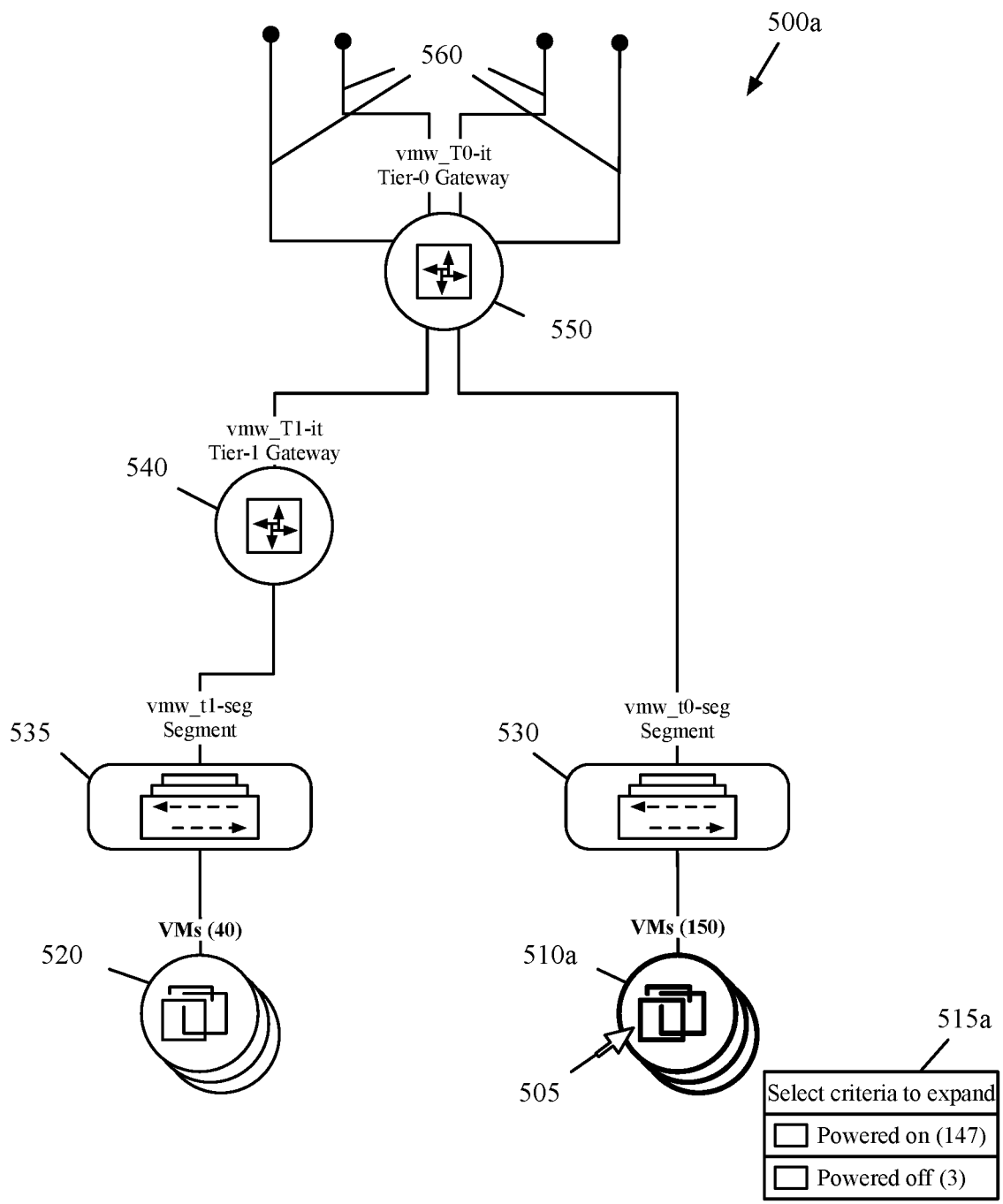
FIGS. 5A-5C illustrate UIs of a simple logical network topology in some embodiments before a user has selected any filter UI items, and after a user has selected a filter UI item, respectively.
Figure 5B:
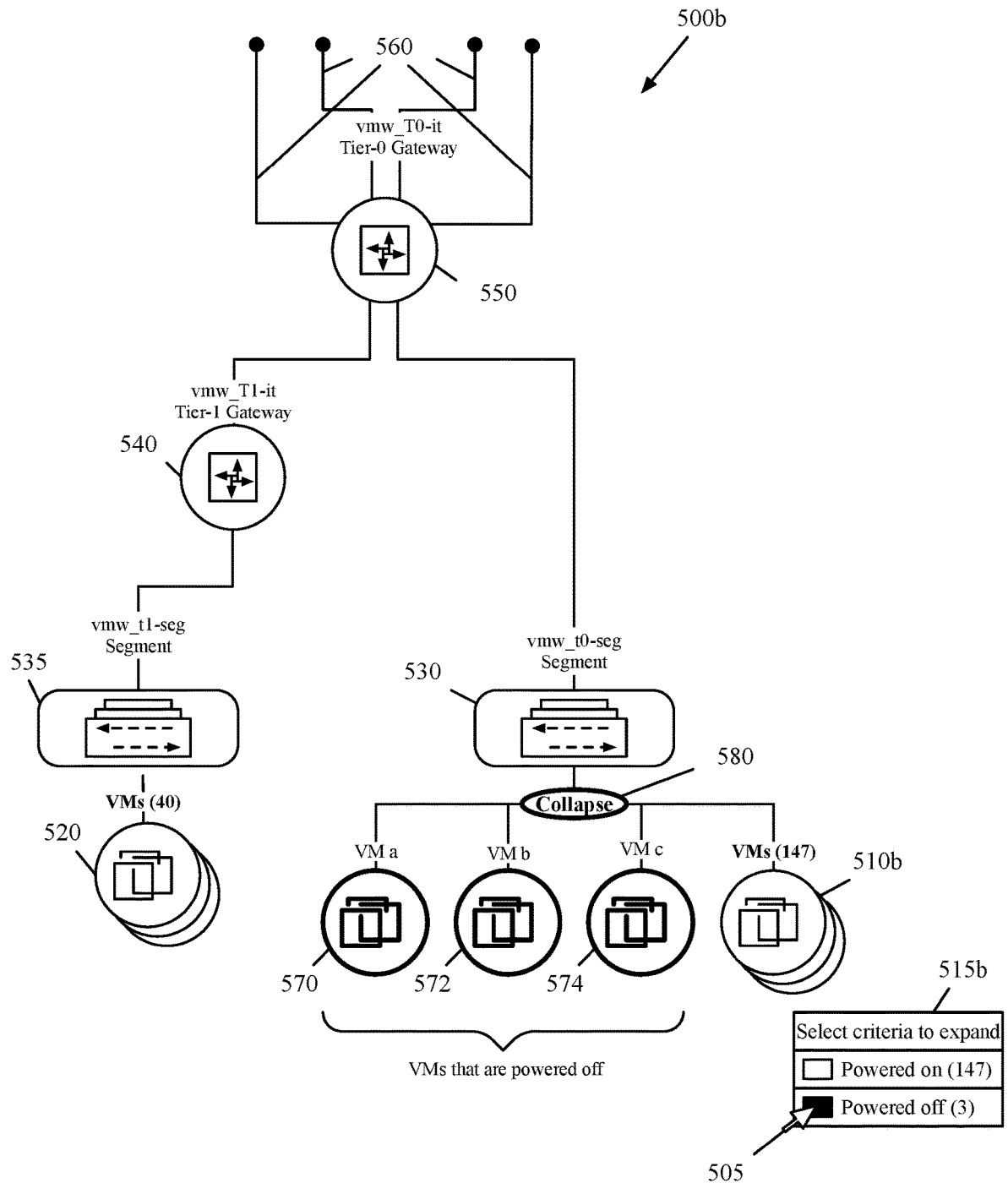
Figure 5C:
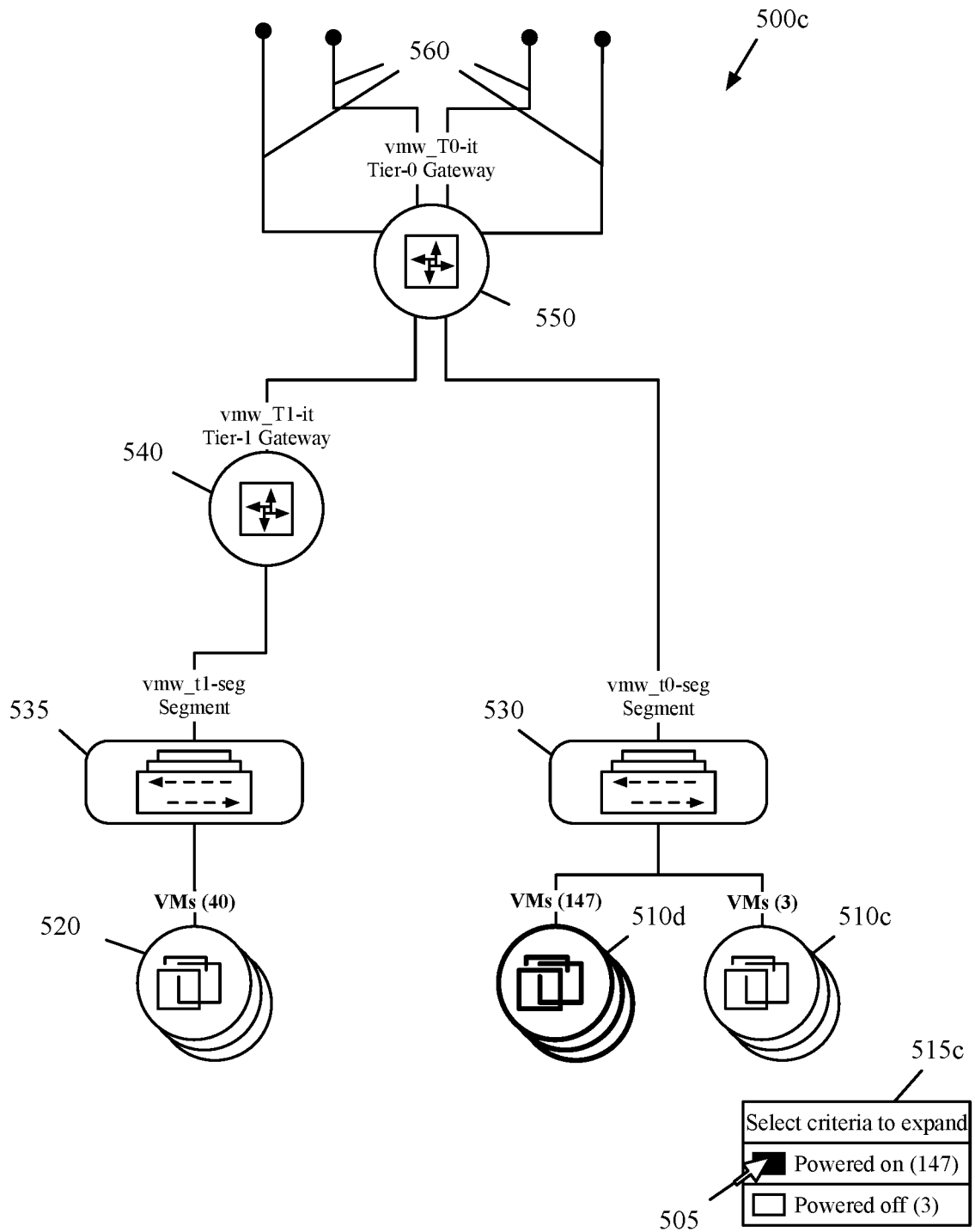

The process 400 starts (at 405) by receiving a selection of a set of attribute states for a selected group node representing a group of logical elements. These selections can be performed via a cursor controller selection, a touchscreen selection, keyboard selection, or other selection mechanism. For example, FIG. 5A illustrates a UI 500a of a simple logical network topology before a user has selected any filter UI items, FIG. 5B illustrates a UI 500b after the user has selected a filter UI item, and FIG. 5C illustrates a UI 500c after a user has selected an alternate filter UI item.

In the UI 500a, a cursor 505 is shown selecting a group node 510a representing a group of 150 VMs, causing a set of selectable filter UI items 515 to be presented. The VMs represented by the group node 510a logically connect to a single segment (e.g., a logical switch) represented by the node 530, which is logically connected to a tier-0 gateway logical router represented by node 550. In addition to its logical connection to the segment represented by node 530, the tier-0 gateway also connects to networks external to the logical network presented in the UI 500a (i.e., via connections 560), as well as to a tier-1 gateway logical router represented by node 540. The tier-1 gateway logical router then logically connects to a segment represented by node 535, which logically connects to another group of 40 VMs represented by group node 520.

The filter UI items 515 presented for the group node 510a are for filtering VMs in the group based on whether they are powered on or powered off, as shown. Additionally, each filter UI item is presented with a number denoting the number of VMs that match the attribute state. In this example, the set of filter UI items 515 indicates that 147 of the 150 VMs in the group are powered on, while 3 VMs in the group are powered off. In the UI 500b, the group node 510a from the UI 500a has been expanded based on a filter selection made by the cursor 505, as reflected by the updated set of filter UI items 515b showing the attribute state "powered off" has been selected, while in the UI 500c, the cursor 505 is instead shown selecting the attribute state "powered on", as reflected by the updated set of filter UI items 515c.

Returning to the process 400, after receiving the selection of the set of attribute states, the process identifies (at 410) logical elements in the group that match the selected set of attribute states. In the UI 500b, for example, three VMs 570, 572, and 574 are identified as the three VMs that are powered off. Once the logical elements have been identified, the process determines (at 415) whether the selected group node is a child node (i.e., a node that has other nodes above it in the hierarchy). The group node 510a, for example, is a child node of the node 530 representing a segment. Conversely, the node 550 representing a tier-0 gateway logical router is not a child node.

When the process determines (at 415) that the selected group node is not a child node, the process transitions to 435 to determine whether the selected group node is a parent node. Otherwise, when the process determines (at 415) that the selected group node is a child node, the process transitions to 420 to determine whether there are any group nodes above the selected group node in the hierarchy. The group node 510a, for example, is a child node, but does not have any group nodes above it (i.e., all of the nodes above the group node in the hierarchy are individual nodes representing individual logical elements).

Figure 6A:
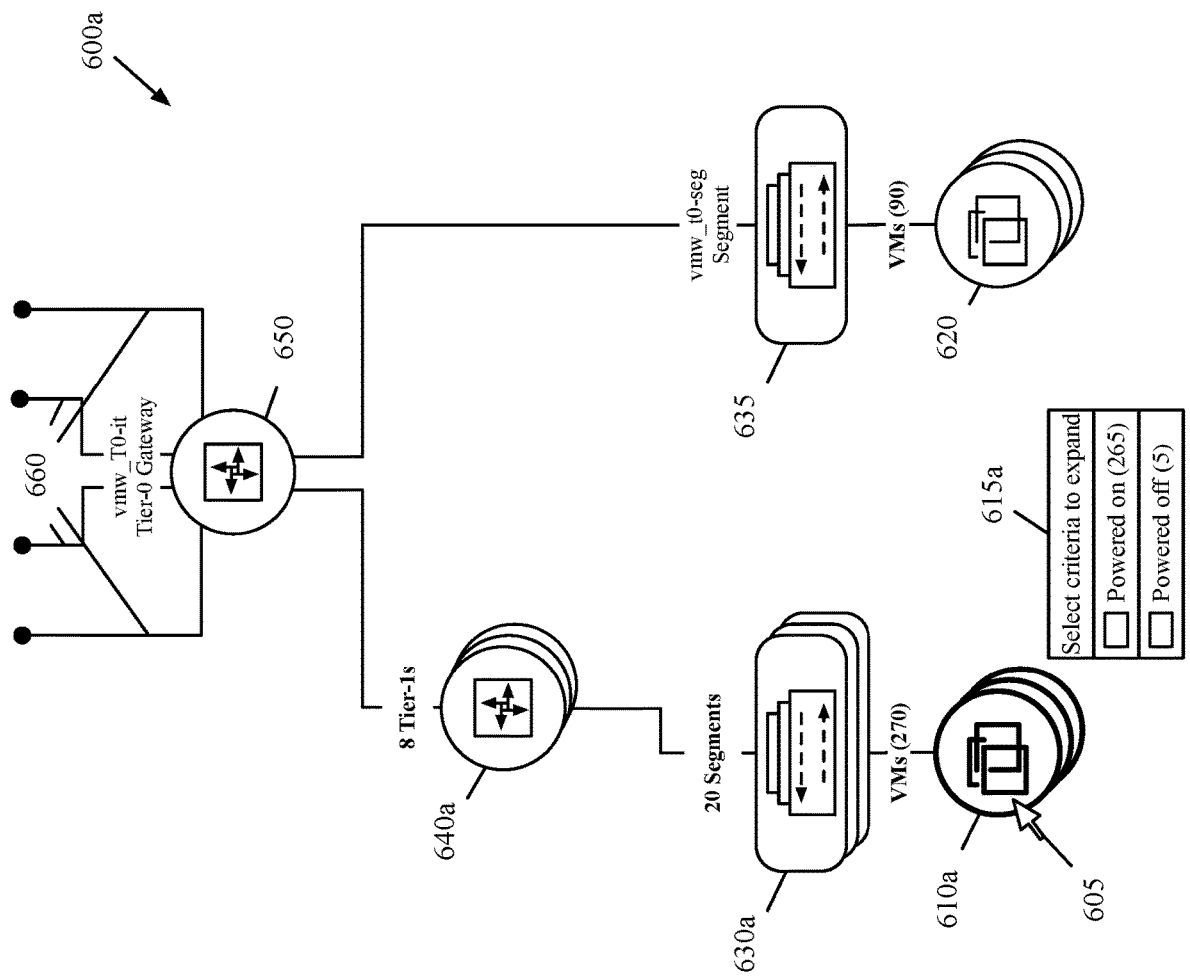
FIGS. 6A-6B illustrate UIs of a more complex logical network topology in some embodiments before a user has selected any filter UI items, and after a user has selected a filter UI item, respectively.
Figure 6B:
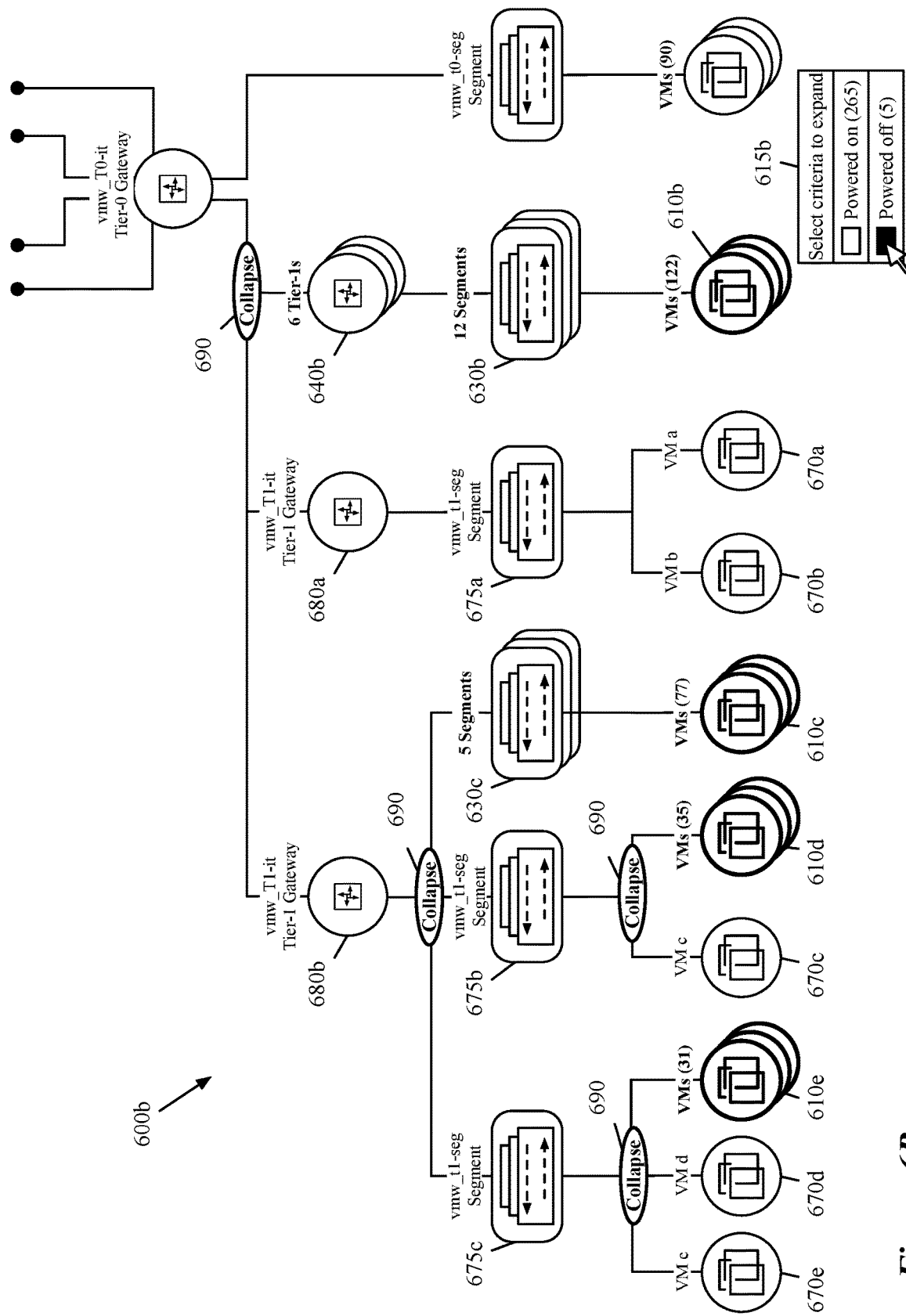

FIGS. 6A-6B illustrate a more complex logical network topology presented in a UI 600a before any filters have been applied, and a UI 600b after at least one filter has been applied, respectively. In the UI 600a, a cursor 605 is shown selecting a group node 610a representing a group of 270 VMs. Based on the selection, a set of filter UI items 615a is presented for filtering the group of 270 VMs. The group node 610a of VMs is logically connected to a group node 630a that represents a group of 20 segments. The group node 630a of segments is logically connected to a group node 640a that represents a group of 8 tier-1 gateway logical routers that logically connect to a tier-0 gateway logical router 650. The tier-0 gateway logical router 650 is also connected (via connections 660) to networks external to the logical network, as well as to a node 635 representing a segment, which logically connects to a group node 620 representing a group of 90 VMs.

When the process determines (at 420) that there are not any group nodes above the selected group node in the hierarchy (e.g., like the selected group node 510a), the process transitions to 435 to determine whether the selected group node is a parent node. Otherwise, when the process determines (at 420) that there is at least one group node above the selected group node in the hierarchy (e.g., like the selected group node 610a), the process transitions to 425 to identify logical connections between the identified logical elements of the selected group node and logical elements of group node(s) above the selected group node in the hierarchy.

For example, for the UI 600*a*, the process would need to determine which of the segments represented by the group node 630*a* are logically connected to VMs represented by the group node 610*a* that were identified (i.e., during step 410) as matching a selected filter UI item (i.e., "powered off", as selected in the UI 600*b*). Additionally, the process would need to determine which of the tier-1 gateway logical routers represented by the group node 640*a* are logically connected to any of the segments identified as being logically connected to the identified VMs. While the node 650 in this example represents a single tier-0 gateway logical router, other embodiments may include a group node representing a group of tier-0 gateway logical routers for which logical connections would also need to be identified.

After identifying (at 425) the logical connections, the process determines (at 430) the expansion of the group node(s) above the selected group node in the hierarchy. In some embodiments, logical elements in the selected group node and in group nodes above the selected group node may be expanded based on the identified logical connections and despite not being identified as logical elements that match the selected filter UI item or as logical elements that are logically connected to those identified logical elements.

As illustrated in the UI 600*b*, while the expanded version of the group node 610*a* from the UI 600*a* includes group nodes 610*b*, 610*c*, 610*d*, and 610*e*, as well as individual nodes 670*a*, 670*b*, 670*c*, 670*d*, and 670*e*, expanded versions of the group nodes 630*a* and 640*a* are also presented based on their logical connections to the identified VMs 670*a*-670*e*. For example, the expanded version of the group node 630*a* includes group nodes 630*b* and 630*c*, as well as individual nodes 665*a*, 665*b*, and 665*c*, while the expanded version of the group node 640*a* includes group node 640*b* and individual nodes 680*a* and 680*b*. While the group node 630*c* is not logically connected to any of the VMs 670*a*-670*e* identified as matching the selected filter UI item, this group node does logically connect to the node 680*b* representing a tier-1 gateway logical router, which has a logical connection to two other nodes 675*b* and 675*c* representing segments that have logical connections to some of the VMs identified as matching the selected filter UI item, and thus the group node 630*c* is included in the expansion based on its logical connection to node 680*b*.

Next, the process determines (at 435) whether the selected group node is a parent node in the hierarchy of logical elements. That is, the process determines whether there are any nodes below the selected group node in the hierarchy. The selected nodes 510*a* and 610*a* in the respective UIs 500*a* and 600*a*, for example, are not parent nodes because these group nodes represent groups of VMs and are logical network endpoints.

Figure 7A:
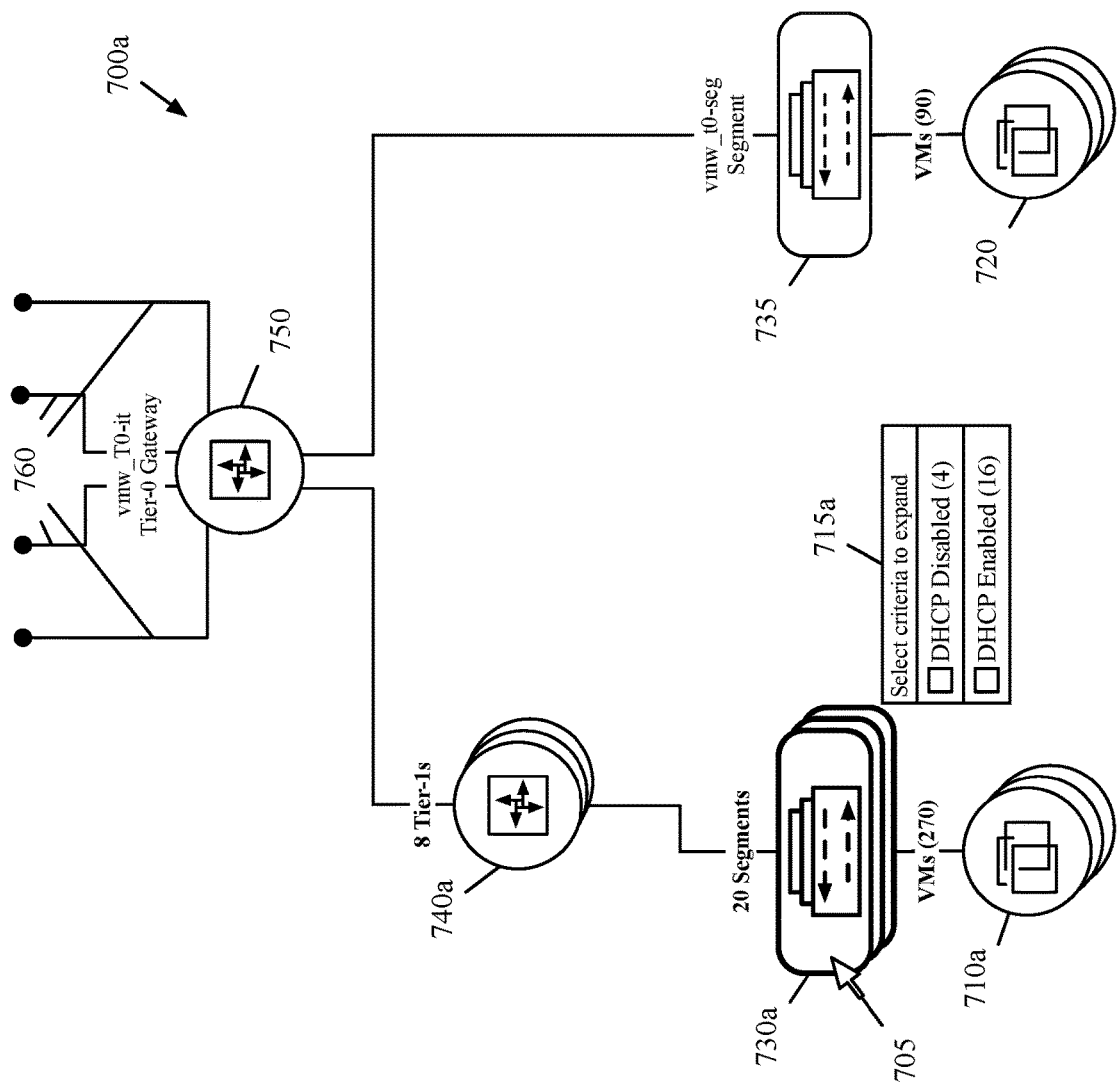
FIGS. 7A-7B illustrate additional examples of UIs of a more complex logical network topology in some embodiments before a user has selected any filter UI items, and after a user has selected a filter UI item, respectively.
Figure 7B:
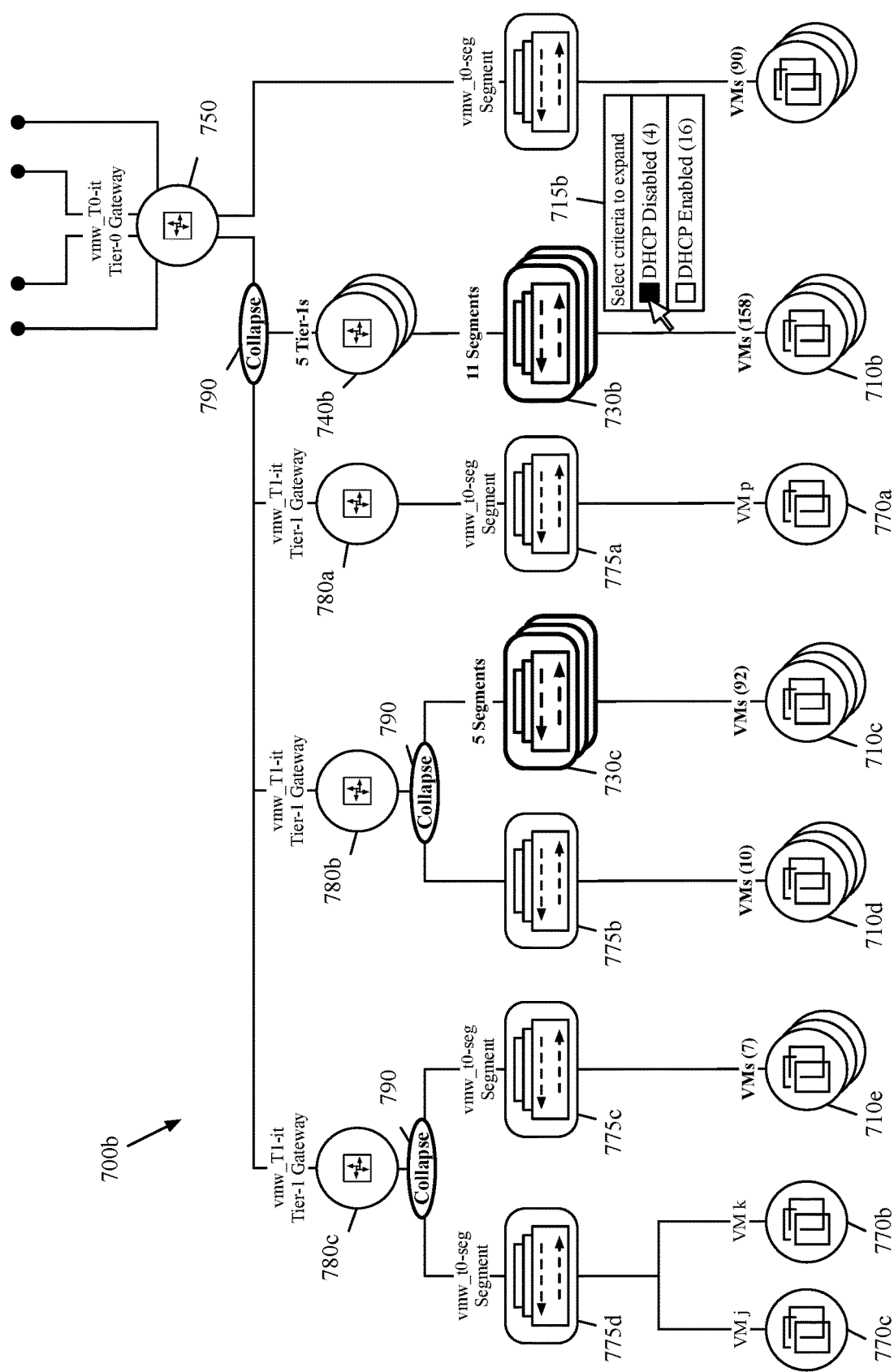

FIGS. 7A-7B illustrate another example of a more complex logical network topology presented in a UI 700*a* before any filters have been applied, and a UI 700*b* after at least one filter has been applied, respectively. Unlike the UIs 500*a* and 600*a*, the cursor 705 in the UI 700*a* is shown selecting group node 730*a* that represents a group of 20 segments, and a set of filter UI items 715*a* is presented for filtering the group of 20 segments. The group node 730*a* is a child node of a group node 740*a* representing a group of 8 tier-1 gateway logical routers based on logical connections between the segments and tier-1 gateway logical routers represented by the group nodes. The group node 740*a* also logically connects to a tier-0 gateway logical router 750, which connects (via connections 760) to networks external to the logical network presented in the UI 700*a*, as well as to a node 735 representing a segment that logically connects to a group node 720 representing a group of 90 VMs. In addition to being a child node of the group node 740*a*, the group node 730*a* is also a parent node to a group node 710*a* representing a group of 270 VMs, as shown.

When the process determines (at 435) that the selected group node is not a parent node (e.g., in the UIs 500*a* and 600*a*), the process transitions to 445 to present an expanded version of the selected group node. For example, in the UI 500*b*, an expanded version of the group node 510*a* is shown to include a group node 510*b* representing 147 VMs that do not match the selected filter UI item "powered off", and three individual nodes 570-574 representing three individual VMs from the group that do match the selected filter UI item.

Conversely, in the UI 500*c*, the selected filter UI item "powered on" includes 147 VMs, and as such, the group node 510*a* from the UI 500*a* is now split into two group nodes. As shown, group node 510*c* represents the set of 3 VMs that are powered off and do not match the selected filter UI item, and the group node 510*d* represents the 147 VMs that are powered on and do match the selected filter UI item. While the 3 VMs that are powered off do not meet a threshold for being presented as a group node under other circumstances, they are presented as a group node in this instance because they do not match the filter UI item selected for expansion, and therefore are not expanded. The group of 147 VMs that do match the expansion criteria are still represented as a group node separate from the group node representing VMs that do not match the expansion criteria as the threshold for being presented as a group node has been exceeded. As mentioned above, the group node representing logical elements that match the selected filter UI item is presented differently (e.g., with a thicker outline, with a different color, etc.), in some embodiments, from the group node representing the logical elements that do not match the selected filter UI item. In the UI 500*c*, for example, the group node 510*d* is presented with a thicker outline than the group node 510*c*.

While the UI 500*c* does not include any individual nodes in its expansion, the UI 500*b* provides a selectable item 580 allowing users to collapse the expanded group node back to a single group node. When expanding group nodes, some embodiments also display UI items (e.g., item 580 in UI 500*b* or items 690 in UI 600*b*) that allow a user to collapse a portion or all of an expanded group of logical elements. For instance, selecting the UI item 580 in UI 500*b* would cause the group of VMs to collapse back into the group node 510*a*. As mentioned above, a user can expand a collapsed group node, in some embodiments, by double-clicking (i.e., with a cursor control device) on the group node.

In a more complex topology, collapsing a group node can have an effect on other group nodes as well. Selecting the UI item 690 located between the tier-0 gateway node 650 and the tier-1 gateway nodes 680*a*-*b* and 640*b* in UI 600*b* would cause these tier-1 gateway nodes to collapse back into a single group node, forcing the segment nodes 630*b*-*c* and 675*a*-*c* to collapse back into their own single group node (in turn forcing the VMs to collapse back into a single group node as well. On the other hand, selection of the UI item 690 underneath the segment node 675 would only cause individual VM node 670*c* and group node 610*d* to collapse back into a single group node.

In some embodiments, the collapse UI item is only provided when the number of logical elements logically connected to the same parent node (individual or group)

above the logical elements in the hierarchy exceeds a threshold number. Group nodes, in some embodiments, can be expanded by users by double-clicking (i.e., with a cursor control device) on the group node. Also, in some embodiments, different types of logical elements have different specified threshold numbers. For example, groups of VMs that exceed five VMs would be provided with the option to collapse, in some embodiments, while groups of segments that exceed two segments would be provided with the option to collapse.

Returning to the process 400, when the process determines (at 435) that the selected group node is a parent node (e.g., in the UI 700a), the process transitions to 440 to identify logical connections between identified logical elements of the selected group node and logical elements below the selected group node in the hierarchy. In the UI 700a, for example, the process would identify logical connections between any of the segments represented by the group node 730a that are identified as matching any selected filter UI items and any VMs represented by the group node 710a.

Next, the process presents (at 445) an expanded version of the selected group node that shows the identified logical elements of the group as individual nodes and the remaining logical elements of the group as one or more group nodes. The process then presents (at 450) expanded versions of any group nodes above or below the selected group node that are identified for expansion based on the logical connections between the identified logical elements of the selected group node and other logical elements.

For example, in the UI 700b, expanded versions of the group nodes 710a, 730a, and 740a are presented based on a selection to filter segments for which DHCP is disabled in the selected group of segments 730a (i.e., selected group node 730a in the UI 700a), as indicated by the updated version of the set of filter UI items 715b. As shown, the expanded version of the group node 730a includes group nodes 730b and 730c, representing groups of eleven segments and five segments, respectively, as well as individual nodes 775a, 775b, 775c, and 775d representing the identified segments for which DHCP is disabled.

Based on logical connections to the segments 775a-775d, the expanded version of the group node 740a (i.e., a parent node of the selected group node 730a) includes a group node 740b representing a group of five tier-1 gateway logical routers, as well as three individual nodes 780a, 780b, and 780c representing three tier-1 gateway logical routers having logical connections to the identified segments 775a-775d. Lastly, the expanded version of the group node 710a (i.e., the child node of the selected group node 730a) includes group nodes 710b, 710c, 710d, and 710e, each representing respective groups of VMs of varying numbers as illustrated, as well as individual nodes 770a, 770b, and 770c representing individual VMs that are logically connected to the identified segments, but do not meet the threshold number for presenting VMs as group nodes.

Conversely, selectable UI items 790 are provided for collapsing the segments under each of the tier-1 gateway logical router nodes 780b and 780c, as well as for collapsing each of nodes representing the tier-1 gateway logical routers 740b and 780a-780c under the tier-0 gateway logical router 750. In some embodiments, collapsing nodes that are parent nodes causes the child nodes of those parent nodes to also be collapsed (i.e., collapsing a group of segments will cause any VMs logically connected to those segments to also be collapsed). Also, in some embodiments, when a large number (e.g., hundreds or thousands) of logical elements match the selected filter UI items, the UI presents the expanded version of the group node representing those logical elements and allows users to pan the UI to view all of the identified logical elements in the expanded version of the group node.

Returning to the process 400, after the process presents (at 450) the expanded versions of any group nodes above or below the selected group node, the process ends. While described as happening serially for the sake of clarity, the steps of the process 400 in some embodiments are performed concurrently (i.e., all at once). Also, while only logical elements are represented in the UI examples described herein, other embodiments also present nodes in the UIs to represent physical elements that implement the logical elements. Additional details regarding the different functionalities of the UI in different embodiments can be found in U.S. patent application Ser. No. 17/185,690, now issued as U.S. Pat. No. 11,336,533, which is incorporated herein by reference.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
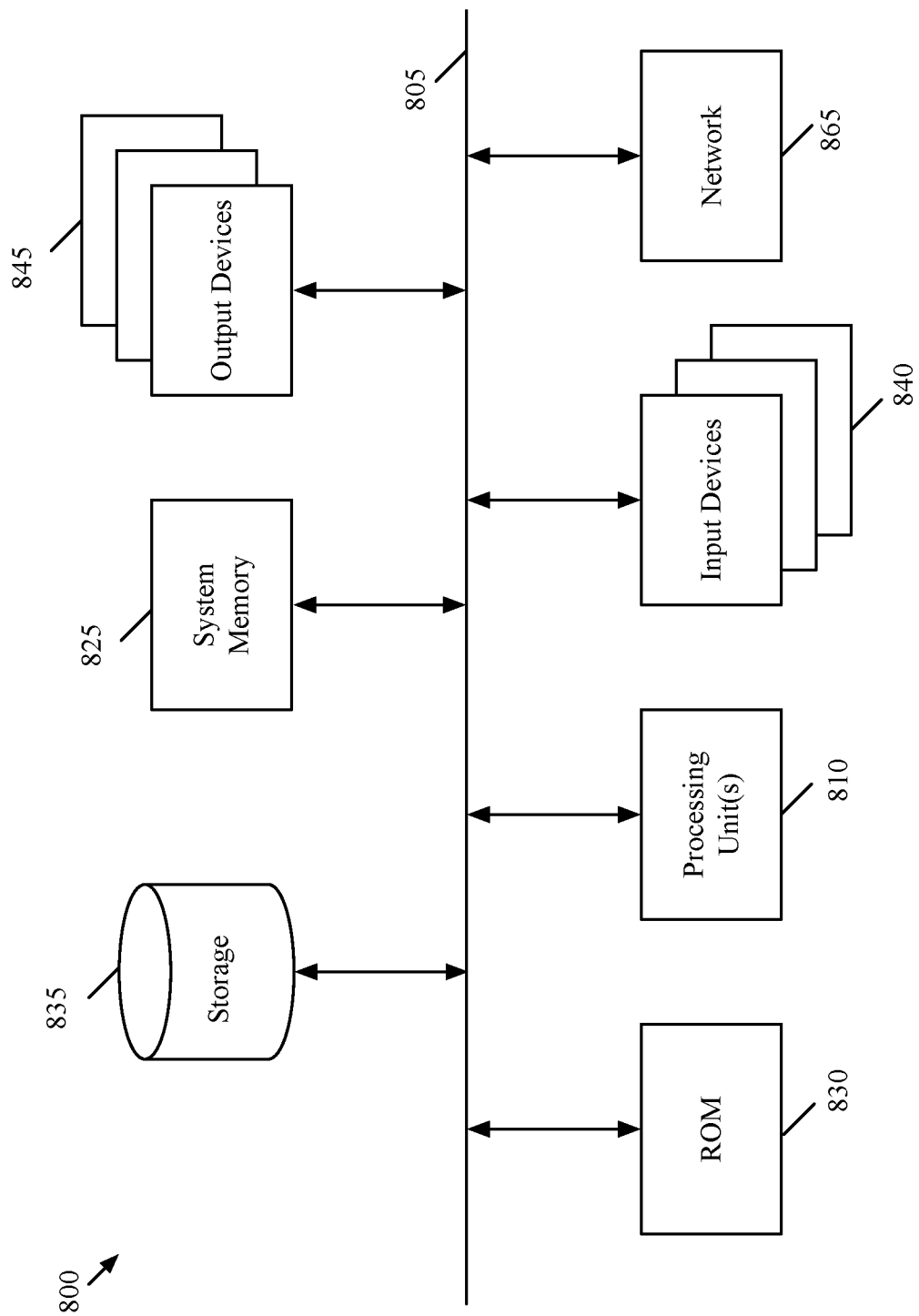
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such as random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 8, bus 805 also couples computer system 800 to a network 865 through a network adapter (not shown). In this manner, the computer can be a part of a network of computers (such as a local area network ("LAN"), a wide area network ("WAN"), or an Intranet), or a network of networks (such as the Internet). Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for presenting a visualization of a topology for a logical network, the method comprising:
   in response to receiving a selection of a particular user interface (UI) item, in a UI, representing a particular group of logical elements, presenting one or more filter UI items for the particular group of logical elements, each filter UI item corresponding to a different attribute associated with logical elements in the particular group of logical elements;
   upon receiving selection of one or more attribute states for each attribute for which a filter UI item is presented, identifying logical elements in the particular group of logical elements that match the selected attribute states; and
   presenting, in the UI, an expanded version of the particular group of logical elements that emphasizes the identified logical elements that match the selected attribute states.

2. The method of claim 1, wherein:
   the particular group of logical elements comprises logical elements of a particular type;
   the UI presents a set of UI items including the particular UI item;
   each respective UI item in the set of UI items represents one or more logical elements of a respective type; and
   the set of UI items are arranged in the UI hierarchically by type of logical element and based on logical network connections.

3. The method of claim 2, wherein the particular UI item comprises a group node, wherein the UI represents the particular group of logical elements using the group node based on the particular group of logical elements exceeding a threshold number of logical elements of the particular type.

4. The method of claim 3, wherein
   the group node is a first group node; and
   presenting the expanded version of the particular group of logical elements that emphasizes the identified logical elements that match the selected attribute states comprises presenting (i) individual nodes representing the identified logical elements and (ii) a second group node representing logical elements in the particular group that do not match the selected attribute states.

5. The method of claim 4, wherein the first group node specifies a first number of logical elements represented by the first group node and the second group node specifies a second number of logical elements represented by the first group node, wherein the first number is greater than the second number.

6. The method of claim 3, wherein
the group node is a first group node; and
presenting the expanded version of the particular group of logical elements that emphasizes the identified logical elements that match the selected attribute states comprises presenting (i) a second group node representing the identified logical elements and (ii) a third group node representing logical elements in the particular group that do not match the selected attribute states, wherein the second group node is presented differently than the third group node to indicate the second group node represents the identified logical elements.

7. The method of claim 3, wherein:
the particular type of logical elements is a first type, the particular group of logical elements is a first group of logical elements, and the group node is a first group node; and
the first group of logical elements are logically connected to a second group of logical elements of a second type that are represented in the UI by a second group node.

8. The method of claim 7, wherein presenting the expanded version of the first group of logical elements that emphasizes the identified logical elements that match the selected attribute states comprises:
identifying, from the second set of logical elements, at least one logical element that is logically connected to at least one of the identified logical elements in the first group that match the selected attribute states;
presenting an expanded version of the second group node such that (i) each logical element in the second group of logical elements that is logically connected to at least one of the identified logical elements in the first group is represented by an individual node and (ii) a third group node representing logical elements in the second group that do not logically connect to any of the identified logical elements in the first group; and
presenting (i) individual nodes representing the identified logical elements and (ii) a fourth group node representing logical elements in the first group that do not match the selected attribute states.

9. The method of claim 2, wherein the set of logical element types comprises at least virtual machine (VM), logical switch, tier-1 logical router that connects groups of logical switches, and tier-0 logical router that connects other logical elements in the logical network to external networks.

10. The method of claim 1, wherein presenting one or more filter UI items for the particular group of logical elements comprises:
identifying a set of potential attributes associated with the logical elements;
for each potential attribute in the set of potential attributes, determining a current state of the attribute for each logical element in the particular group of logical elements; and
when at least two logical elements in the particular group have different current states for a particular attribute in the set of potential attributes, presenting a filter UI item corresponding to the particular attribute.

11. The method of claim 10, wherein each filter UI item presents at least two different states for the particular attribute as selectable attribute states for the attribute corresponding to the filter UI item.

12. The method of claim 10, wherein for each potential attribute for which all logical elements in the particular group of logical elements have a same current state, no filter UI item is presented in the UI.

13. A non-transitory machine-readable medium storing a program which when executed by at least one processing unit presents a visualization of a topology for a logical network, the program comprising sets of instructions for:
in response to receiving a selection of a particular user interface (UI) item, in a UI, representing a particular group of logical elements, presenting one or more filter UI items for the particular group of logical elements, each filter UI item corresponding to a different attribute associated with logical elements in the particular group of logical elements;
upon receiving selection of one or more attribute states for each attribute for which a filter UI item is presented, identifying logical elements in the particular group of logical elements that match the selected attribute states; and
presenting, in the UI, an expanded version of the particular group of logical elements that emphasizes the identified logical elements that match the selected attribute states.

14. The non-transitory machine-readable medium of claim 13, wherein:
the particular group of logical elements comprises logical elements of a particular type;
the UI presents a set of UI items including the particular UI item;
each respective UI item in the set of UI items represents one or more logical elements of a respective type;
the set of UI items are arranged in the UI hierarchically by type of logical element and based on logical network connections;
the particular UI item comprises a group node; and
the UI represents the particular group of logical elements using the group node based on the particular group of logical elements exceeding a threshold number of logical elements of the particular type.

15. The non-transitory machine-readable medium of claim 14, wherein
the group node is a first group node; and
the set of instructions for presenting the expanded version of the particular group of logical elements that emphasizes the identified logical elements that match the selected attribute states comprises a set of instructions for presenting (i) individual nodes representing the identified logical elements and (ii) a second group node representing logical elements in the particular group that do not match the selected attribute states.

16. The non-transitory machine-readable medium of claim 15, wherein the first group node specifies a first number of logical elements represented by the first group node and the second group node specifies a second number of logical elements represented by the first group node, wherein the first number is greater than the second number.

17. The non-transitory machine-readable medium of claim 14, wherein
the group node is a first group node; and
the set of instructions for presenting the expanded version of the particular group of logical elements that emphasizes the identified logical elements that match the selected attribute states comprises a set of instructions for presenting (i) a second group node representing the identified logical elements and (ii) a third group node representing logical elements in the particular group that do not match the selected attribute states, wherein the second group node is presented differently than the third group node to indicate the second group node represents the identified logical elements.

18. The non-transitory machine-readable medium of claim 14, wherein:
the particular type of logical elements is a first type, the particular group of logical elements is a first group of logical elements, and the group node is a first group node;
the first group of logical elements are logically connected to a second group of logical elements of a second type that are represented in the UI by a second group node; and
the set of instructions for presenting the expanded version of the first group of logical elements that emphasizes the identified logical elements that match the selected attribute states comprises sets of instructions for:
identifying, from the second set of logical elements, at least one logical element that is logically connected to at least one of the identified logical elements in the first group that match the selected attribute states;
presenting an expanded version of the second group node such that (i) each logical element in the second group of logical elements that is logically connected to at least one of the identified logical elements in the first group is represented by an individual node and (ii) a third group node representing logical elements in the second group that do not logically connect to any of the identified logical elements in the first group; and
presenting (i) individual nodes representing the identified logical elements and (ii) a fourth group node representing logical elements in the first group that do not match the selected attribute states.

19. The non-transitory machine-readable medium of claim 13, wherein the set of instructions for presenting one or more filter UI items for the particular group of logical elements comprises sets of instructions for:
identifying a set of potential attributes associated with the logical elements;
for each potential attribute in the set of potential attributes, determining a current state of the attribute for each logical element in the particular group of logical elements; and
when at least two logical elements in the particular group have different current states for a particular attribute in the set of potential attributes, presenting a filter UI item corresponding to the particular attribute.

20. The non-transitory machine-readable medium of claim 19, wherein each filter UI item presents at least two different states for the particular attribute as selectable attribute states for the attribute corresponding to the filter UI item.

21. The non-transitory machine-readable medium of claim 19, wherein for each potential attribute for which all logical elements in the particular group of logical elements have a same current state, no filter UI item is presented in the UI.

22. An electronic device comprising:
a set of processing units; and
a non-transitory machine-readable medium storing a program which when executed by at least one of the processing units presents a visualization of a topology for a logical network, the program comprising sets of instructions for:
in response to receiving a selection of a particular user interface (UI) item, in a UI, representing a particular group of logical elements, presenting one or more filter UI items for the particular group of logical elements, each filter UI item corresponding to a different attribute associated with logical elements in the particular group of logical elements;
upon receiving selection of one or more attribute states for each attribute for which a filter UI item is presented, identifying logical elements in the particular group of logical elements that match the selected attribute states; and
presenting, in the UI, an expanded version of the particular group of logical elements that emphasizes the identified logical elements that match the selected attribute states.

* * * * *